United States Patent [19]
Wojciechowski et al.

[11] Patent Number: 6,038,092
[45] Date of Patent: Mar. 14, 2000

[54] SYSTEM FOR READING DATA FROM A DISTORTED MAGNETIC TAPE MEDIA

[75] Inventors: Matthew Peter Wojciechowski, Broomfield; Kurt William Pyatt, Longmont, both of Colo.

[73] Assignee: Storage Technology Corporation, Louisville, Colo.

[21] Appl. No.: 09/067,597

[22] Filed: Apr. 27, 1998

[51] Int. Cl.[7] .............................. G11B 5/09; G11B 27/36; G11B 15/48
[52] U.S. Cl. .............................. 360/53; 360/31; 360/74.4
[58] Field of Search .................................. 360/31, 53, 64, 360/74.4, 77.16

[56] References Cited

U.S. PATENT DOCUMENTS

| | | | |
|---|---|---|---|
| 5,416,642 | 5/1995 | Nakagawara et al. | 360/31 |
| 5,521,769 | 5/1996 | Suga et al. | 360/77.16 |
| 5,969,898 | 10/1999 | Hansen et al. | 360/77.16 |

*Primary Examiner*—W. Chris Kim
*Attorney, Agent, or Firm*—Duft, Graziano & Forest

[57] ABSTRACT

A characteristic of helical scan tracks is that a distortion that occurs in the written data tracks is not uniform over the entire length of the track. Therefore, segments of the helical scan track can be read even though the entirety of the helical scan track cannot be read in a single pass. Therefore, laterally moving the read heads a predetermined distance in a selected direction to access a section of the helical track can produce full amplitude read signals and thereby that section of helical scan track can be read. Once a section of the helical scan track is read, the read heads are moved another incremental distance to access a next section of the distorted helical scan track. Each section of the track is thereby read on a different helical scan as the read heads are incrementally repositioned on each scan. The read sections of the helical scan track are stored in the memory of the tape drive control unit and then used to reconstruct the entirety of the track. This enables the tape drive system to recover the entirety of the distorted helical scan track and data is not lost.

11 Claims, 4 Drawing Sheets

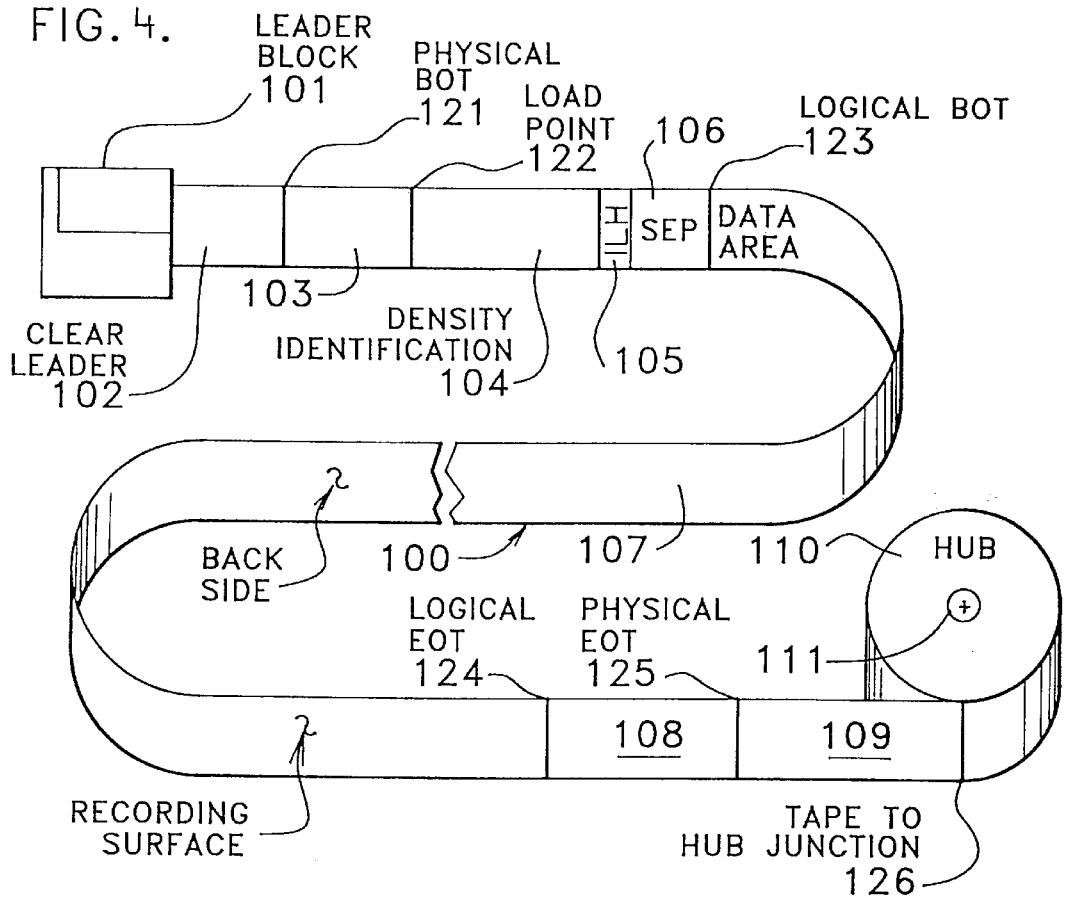
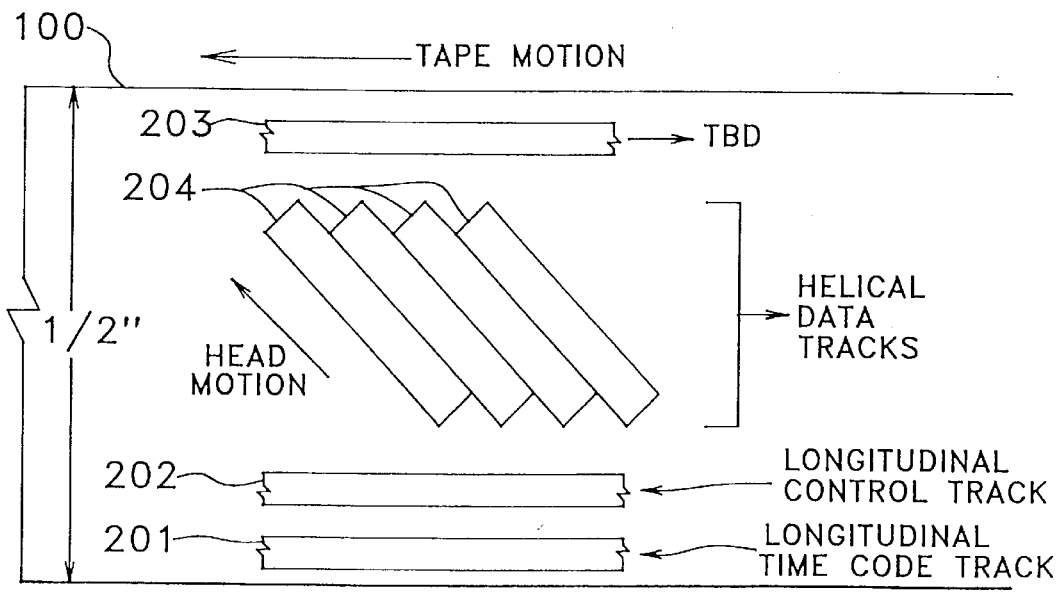

SYSTEM FOR READING DATA FROM A DISTORTED MAGNETIC TAPE MEDIA

FIELD OF THE INVENTION

This invention relates to magnetic data storage media and, in particular, to a system for reading helically scan written data from a magnetic tape media when errors occur in the reading process due to distortions in the tape itself or distortions in the manner in which the data is written on the tape.

PROBLEM

It is a problem in the field of data storage systems to maximize the data read/write efficiency and reliability of the data storage media. Magnetic tape has become the industry standard data storage media for the storage and retrieval of large amounts of data, where the media cost must be kept to a minimum and the data retrieval time is not a critical factor. The data storage capacity and media cost of magnetic tape have been reduced by the use of helical scan data recording techniques on magnetic tape media. Helical scan tape drive systems make use of a 3480-type magnetic tape cartridge that contains a single reel of half inch magnetic tape. The 3480-type magnetic tape cartridge is an industry standard media form factor used in the data processing industry for longitudinal recording of data on magnetic tape. The helical scan data recording format used in helical scan tape drive systems enables the user to store significantly more data on a 3480-type magnetic tape form factor cartridge than is presently available with longitudinal recording on the magnetic tape.

A significant problem with magnetic tape media is that the data that is written thereon can become unreadable by the tape drive. This problem can be caused by the data being written on the magnetic tape in a nonuniform manner or, more likely, that the magnetic tape media is subject to damage. One mode of tape damage is the presence of distortions in the magnetic tape media caused by improper storage and handling. The data that is written on a distorted magnetic tape typically cannot be read because the extent of the distortion exceeds the capability of the error check codes that are written on the magnetic tape along with the data. Once this occurs, the data is irretrievably lost.

SOLUTION

The above described problems are solved and a technical advance achieved in the field by the present system for reading data from a distorted magnetic tape media that functions to increase the data retrievability. This is accomplished by the use of control software and existing hardware in the tape drive control unit that incrementally repositions the read heads of the tape drive in a controlled manner to read segments of the data tracks from the distorted magnetic tape. The read segments are then used to reconstruct the entirety of the track of data.

A characteristic of helical scan tracks is that a distortion that occurs in the written data tracks is not uniform over the entire length of the track. Therefore, segments of the distorted helical scan track can be read even though the entirety of the distorted helical scan track cannot be read in a single pass. Therefore, laterally moving the read heads a predetermined distance in a selected direction to access a section of the distorted helical scan track can produce full amplitude read signals and that section of the distorted helical scan track can be read. Once a section of the distorted helical scan track is read, the read heads are moved another incremental distance to access a next section of the distorted helical scan track. Each section of the distorted helical scan track is thereby read on a different helical scan as the read heads are incrementally repositioned on each scan. The read sections of the distorted helical scan track are stored in the memory of the tape drive control unit and then used to reconstruct the entirety of the track. This enables the tape drive system to recover the entirety of the distorted helical scan track and data is not lost.

BRIEF DESCRIPTION OF THE DRAWING

FIGS. 4 and 5 illustrate the data recording format of helical scan magnetic tape;

DETAILED DESCRIPTION

Tape Drive System Architecture

Figure 3:
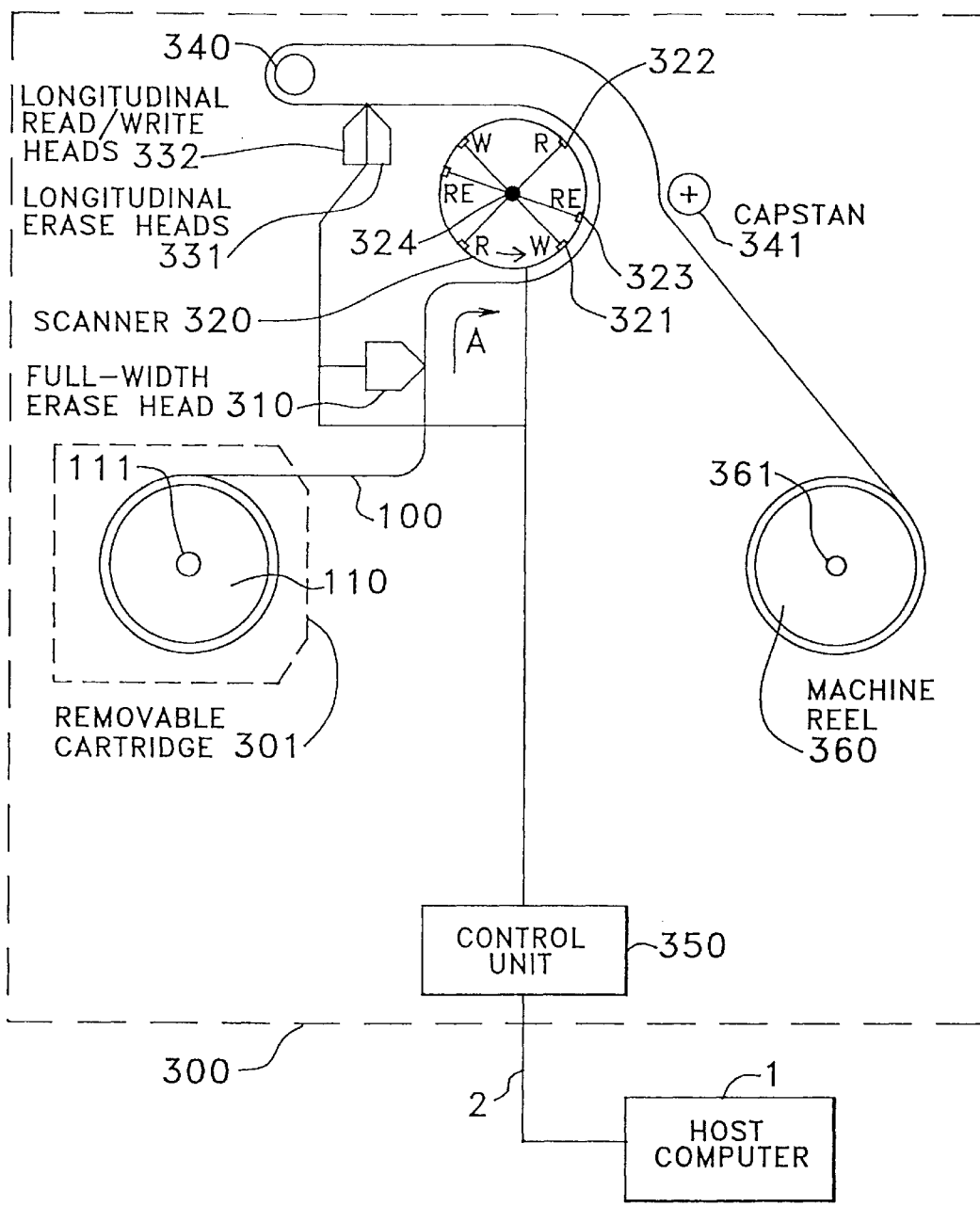
FIG. 3 illustrates in block diagram form the overall architecture of a typical tape drive control unit.

The apparatus illustrated in FIG. 3 represents the well known tape transport elements found in helical scan tape drives 300 that are used to read and write data on magnetic tape 100. The magnetic tape 100 is wound on a single reel 110 which rotates around spindle 111 within magnetic tape cartridge 301. In a helical scan tape drive 300, magnetic tape 100 from magnetic tape cartridge 301 is threaded in direction A past a fixed full width erase head 310, scanner 320 (which contains two pairs of helical read heads 322 and two pairs of helical write heads 321 and one pair of erase heads 323), a fixed longitudinal erase head 331 and a fixed longitudinal read/write head 332. The magnetic tape 100 then passes around guide 340, over capstan 341 to be wound on machine reel 360 which rotates around spindle 361. The full width erase head 310 erases the entire width of magnetic tape 100 and is used when data is recorded on virgin tape. It is also used when data is recorded on a previously used magnetic tape, if none of the data previously recorded on magnetic tape 100 is to be preserved and the entire magnetic tape 100 is overwritten with new data.

Host computer 1 transmits a stream of data records to control unit 350 in tape drive 300, where the data records are formatted for writing in helical scan form on magnetic tape 100 via scanner 320. The tape wrap angle around scanner 320 is slightly greater than 180° so that a pair of read heads 322, a pair of write heads 321 and one erase head 323 are constantly in contact with magnetic tape 100 in order to continuously read and write data thereon. The helical write head pairs 321 simultaneously record two tracks of data at a time on magnetic tape 100 with an azimuth angle between adjacenttracks being plus and minus 20°. Similarly, helical read head pairs 322 simultaneously play back two tracks of data at a time from magnetic tape 100. There are also three fixed longitudinal erase 331 and read/write heads 332 to read and write data on the corresponding three longitudinal tracks contained on magnetic tape 100: control, time code and one to be determined. These three longitudinal read/write heads 332 can be used individually or in any combination when editing new information into pre-recorded data

Physical Format of Helical Scan Magnetic Tape

Figure 6:
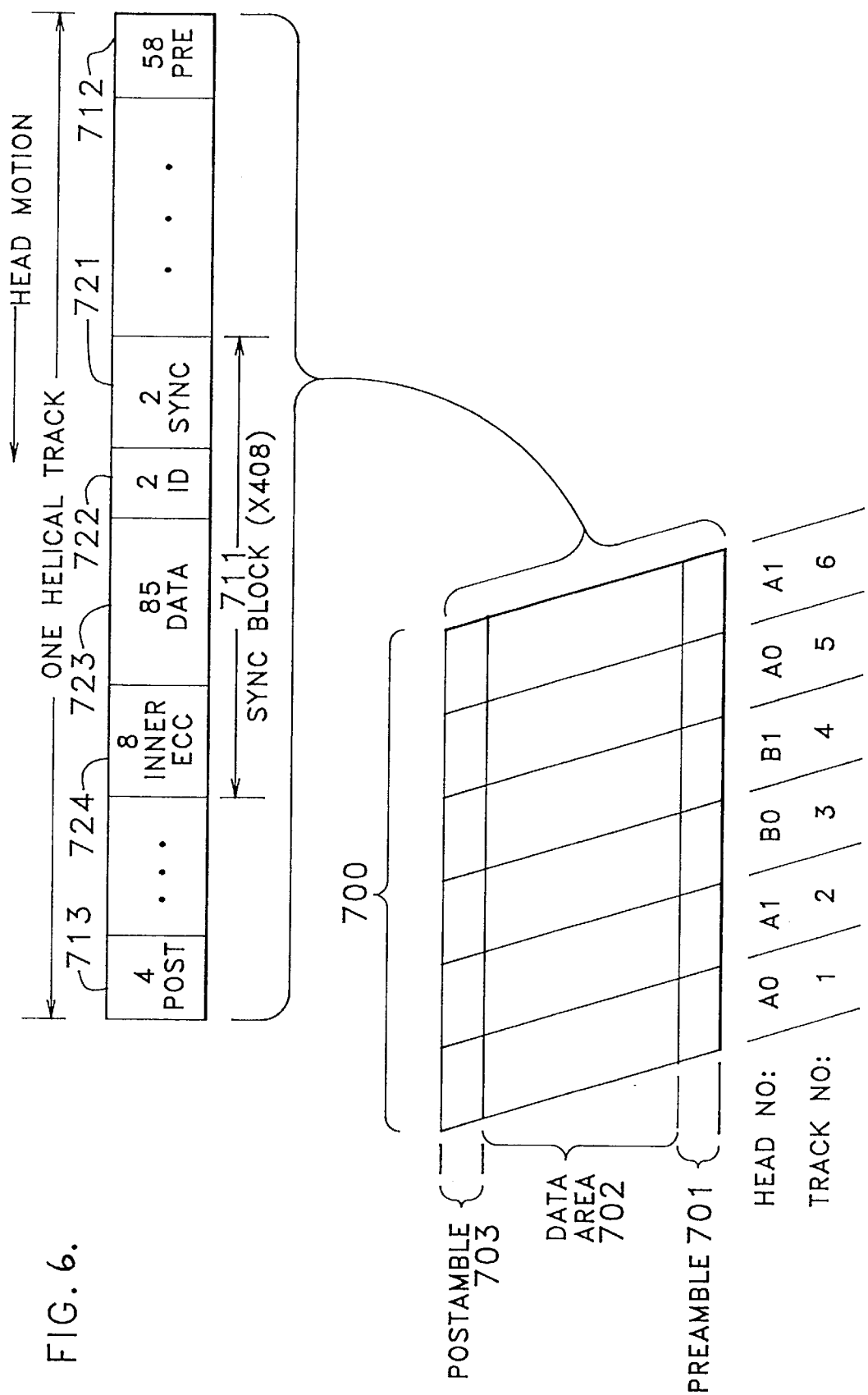
FIG. 6 illustrates the physical format of helical scan magnetic tape.

FIG. 6 illustrates the physical format of the helical scan magnetic tape 100, including the header segment 105 thereof. The magnetic tape 100 includes a leader block 101 that is attached at one end thereto and a single file reel 110 around which magnetic tape 100 is wound into cartridge 301. A length of clear leader 102 is optionally interposed between the physical beginning (BOT) 121 of magnetic tape 100 and leader block 101 in order to protect magnetic tape 100 when it is wound in magnetic tape cartridge 301 around file reel 110. A length 103 (typically 3 m) of magnetic tape 100 exists between the physical beginning of tape 121 and a locale, known as the load point 122, at which point the density identification segment 104 of magnetic tape 100 begins. The density identification segment 104 typically consists of 209 scan groups 700 (FIG. 5) written on magnetic tape 100. The density identification segment 104 represents data, for tape drive control unit 350 to access, indicative of the physical characteristics of magnetic tape 100. Internal leader header segment 105 is located at the end of density identification segment 104 of magnetic tape 100. The internal leader header 105 consists of a three scan groups 700, the third of which is an ECC scan group to error check the two preceding internal leader header scan groups. The internal leader header 105 is followed by separator segment 106 of magnetic tape 100, which typically consists of 300 scan groups. The separator segment 106 isolates the logical beginning of tape (BOT) 123, which is the start of the data area 107 of magnetic tape 100, from the prepended header information described above. The data area 107 of magnetic tape 100 constitutes the majority of magnetic tape 100 and ends at the logical end of tape 124 which is a predetermined distance from tape to hub junction 126, wherein magnetic tape 100 is affixed to single file reel 110 of magnetic tape cartridge 301. A length of trailer tape 109 may be interposed between the physical end (EOT) of tape 125 and tape to hub junction 126. This serves as a method of attaching magnetic tape 100 to file reel 1 10 in order to provide a secure method of attachment thereto.

Data Format of the Helical Scan Magnetic Tape

FIGS. 4 and 5 illustrate the data recording format of helical scan magnetic tape 100 used herein. Magnetic tape 100 is divided into 182 sectors, each of which is subdivided into a plurality of scan groups 700. The scan group 700 is the basic unit for formatting data on magnetic tape 100. As two adjacent write heads 321 of scanner 320 move across magnetic tape 100, two helical tracks 204 of data are simultaneously written on to magnetic tape 100. Once scanner 320 has completed one half of a revolution, the other pair of write heads 321 begins to write the next two adjacent tracks 204 on to magnetic tape 100. One and a half revolutions of scanner 320 produce the six tracks (1–6) illustrated in FIG. 6 to complete a single scan group 700. As can be seen from FIG. 6, a postamble 703 and preamble 701 are written on either end of the data area 702 of each track 204 written on to magnetic tape 100 in order to enable read heads 322 to accurately read the data contained therein.

In addition, the data format of a single helical track is illustrated in FIG. 6 to note that preamble 712 consists typically of fifty-eight bytes of data and postamble 713 includes four bytes of data. Interposed between preamble 712 and postamble 713 are 408 sync blocks 711, each of which contain eighty-five bytes of user data 723. In addition, two synchronization bytes 721 are prepended to data 723 along with two identification bytes 722. Eight bytes of inner error correcting code 724 are appended to the end of data 723 in order to complete the format of sync block 711. The inner ECC code 724 illustrated in FIG. 6 covers both data 723 and identification 722 but not synchronization bytes 721 contained in sync block 711. Therefore, a 93, 85 Reed Solomon code is formed to detect errors contained in data 723 and identification 722 fields of sync block 711. The sync pattern 721 portion of sync block 711 is a fixed pattern of data bits used to resynchronize the read clock and logic after dropouts. Of the 408 sync blocks 711 in a single track 204, twenty-four are used at the start of track 204 for outer ECC check bytes (described below). Therefore, there are (408–24)×85=32,640 bytes per track 24 of user data 723. With six tracks 204 per scan group 700, a scan group 700 therefore contains 97,920 bytes of user data 723.

Distortions in the Magnetic Tape Media

Figure 2:
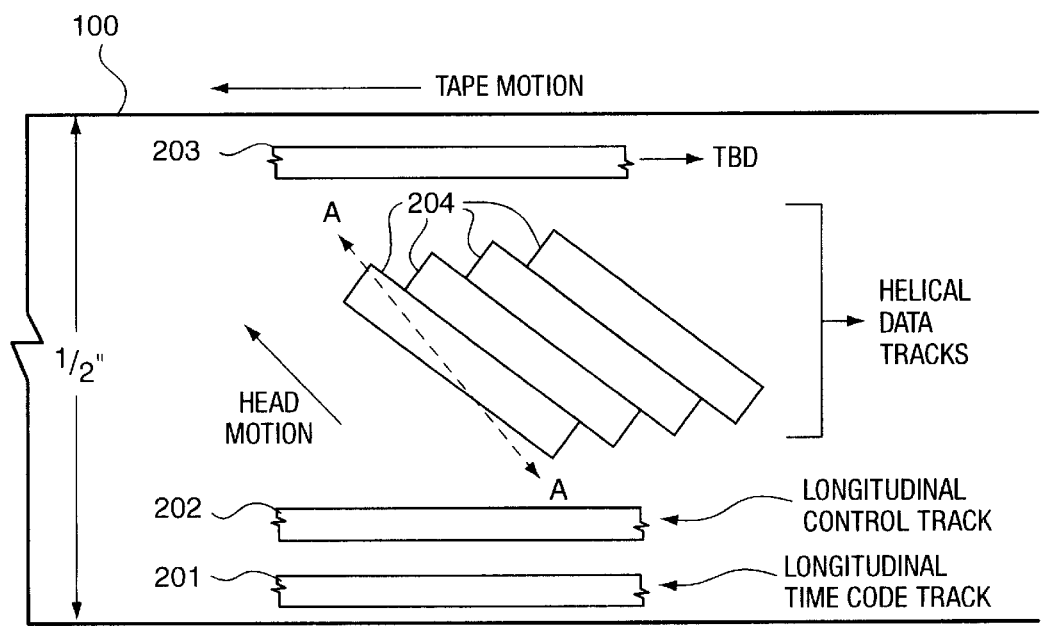
FIG. 2 illustrates an instance of a distorted helical scan track.

A characteristic of helical scan tracks is that a distortion that occurs in the written data tracks is not uniform over the entire length of the track and likely does not extend beyond a limited extent along the length of the magnetic tape. Therefore, segments of the helical scan track can be read even though the entirety of the helical scan track cannot be read in a single pass. An example of a typical simple distortion to the helical scan tracks of data that are written on to a magnetic tape media 100 is illustrated in FIG. 2, where the helical scan tracks 204 are written in a manner that does not align with the defined architecture of the magnetic tape as illustrated in FIGS. 4 and 5 and the path A—A that the read heads 322 take in their scan pattern. In particular, the set of helical scan tracks 204 are not written parallel to the edge of the tape and the longitudinal tracks 201–203 written on the magnetic tape 100. Therefore, when the read heads 322 attempt to read the helical scan tracks 204 in this group of helical scan tracks, only a segment of the helical scan tracks 204 will align with the path taken by the read heads 322 across the width of the magnetic tape 100. The remainder of the helical scan tracks will not be read by the read heads 322 since these sections of the helical scan tracks do not align with the read heads 322 to produce a read signal of sufficient magnitude to be interpretable by the read circuitry in the tape drive.

Method of Reconstructing Distorted Helical Scan Tracks

The present system for reading data from distorted helical scan tracks reads the entirety of the distorted helical scan track by laterally moving the read heads a predetermined distance in a selected direction to access a section of the distorted helical track than previously could not be read. This repositioning of the read heads can produce full amplitude read signals and thereby that section of the distorted helical scan track can be read. Once a section of the distorted helical scan track is read, the read heads are moved another incremental distance to access a next section of the distorted helical scan track. Each section of the distorted helical scan track is thereby read on a different helical scan as the read heads are incrementally repositioned on each scan. The read sections of the distorted helical scan track are stored in the memory of the tape drive control unit 350 and then used to reconstruct the entirety of the track. This enables the tape drive system to recover the entirety of the distorted helical scan track and data is not lost.

The operation of this system for reading data from distorted helical scan tracks is typically implemented as a software process that executes on the processor of the tape drive control unit 350. However, the system can be alternatively implemented as a combination of hardware and software or firmware.

Figure 1:
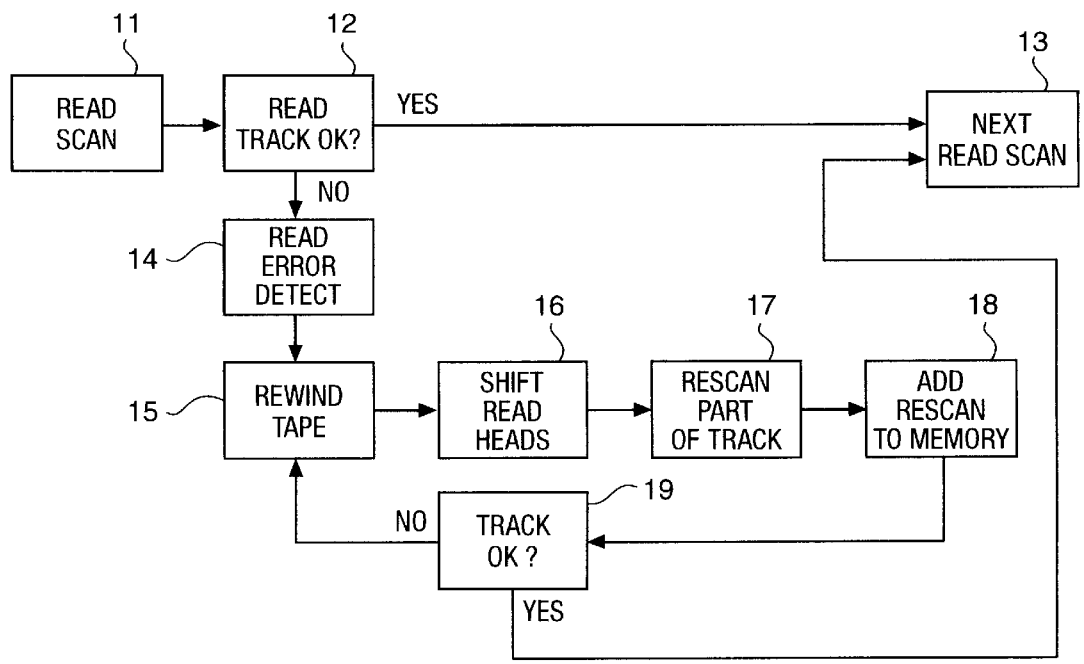
FIG. 1 illustrates in flow diagram form the operation of the present system for reading data from a distorted magnetic tape media.

In order to illustrate the operation of this system, the operational steps taken by this process are disclosed in flow diagram form in FIG. 1. At step 11 the tape drive, in processing a data record read request that is received from a host processor, executes a standard read scan of the selected helical scan tracks that are part of the requested data record that is written on the magnetic tape. At step 12, the tape drive controller determines whether the selected helical scan track was read in its entirety. If a complete helical scan track was accurately read in this pass, processing advances to step 13 where the next read scan operation is activated and executed by the tape drive. If the data written on the selected helical scan track could not be read in its entirety at step 11, as determined by the tape drive controller at step 12, then the read portion of the selected helical scan track is stored in memory, and processing advances to step 14 where the selected helical scan track is designated as a distorted helical scan track and a read error process is initiated. At step 15, the tape drive control unit stops the forward motion of the magnetic tape and rewinds the magnetic tape back to a position where the distorted helical scan track can again be read.

At step 16, the read heads are moved a predetermined distance in a selected direction, either a fixed amount, or as determined by the extent of the readable portion of the distorted helical scan track. In particular, the tape drive control unit can determine what portion of the distorted helical scan track can be read in the initial scan based upon the timing and data frames that are read during this process. Once the readable portion of the distorted helical scan track is identified, certain assumptions can be made regarding the nature and severity of the distortion. Given these determinations, the tape drive control unit can select the magnitude and direction of the read head displacement that is required to most effectively read the maximum amount of the remaining unread portion of the distorted helical scan track. Alternatively, a fixed reconstruction algorithm can be used where the read heads are displaced a predetermined distance in a predetermined direction to read the unread portions of the distorted helical scan track. If the selected direction of read head displacement is incorrect, the reread operation will fail to retrieve any of the remaining unread portion of the distorted helical scan track and the tape drive control unit can reposition the read heads in the opposite direction.

At step 17, the tape drive control unit initiates forward motion of the magnetic tape and the distorted helical scan track is reread. In effect, only a portion of the distorted helical scan track is read, since the read heads have been repositioned and only a portion of the distorted helical scan track passes across the read heads during this scan. At step 18, the tape drive control unit adds the data that is read during this last executed scan operation to the helical scan data that was stored in memory during the previous scan operation. At step 19 the tape drive control unit determines whether the data stored in memory constitutes the entirety of the distorted helical scan track. If not, processing advances to step 15 where the process of steps 15–19 are repeated until the entirety of the distorted helical scan track is read or it is determined that a portion of the selected helical scan track is unreadable by the tape drive system. If at step 9 the tape drive control unit determines that the data stored in memory constitutes the entirety of the distorted helical scan track, then processing advances to step 3 where the next read scan operation is activated.

SUMMARY

Thus, the tape drive control unit detects the presence of a distorted helical scan track written on the magnetic tape and then incrementally repositions the read heads of the tape drive in a controlled manner to read segments of the data tracks from the distorted magnetic tape. The read segments are then used to reconstruct the entirety of the track of data.

We claim:

1. Apparatus in a tape drive that reads data, written in helical track form, from a magnetic tape media that is loaded in said tape drive, comprising:

means, responsive to a magnetic tape being loaded in said tape drive, for reading selected helical tracks written on said magnetic tape using a set of movable read heads;

means for detecting the presence of a section of at least one track of said data read from said magnetic tape that cannot be read;

means for rewinding said magnetic tape to a position to reread said at least one track;

means for repositioning said movable read heads;

means for rereading said at least one track written on said magnetic tape using a set of movable read heads;

means for combining data read from said at least one track written on said magnetic tape by said means for reading and said means for rereading.

2. The apparatus of claim 1 wherein said means for repositioning comprises: means for determining a location of said section in said at least one track; and means, responsive to said determined location, for selecting a direction to reposition said movable read heads.

3. The apparatus of claim 2 wherein said means for repositioning further comprises:

means, responsive to said determined location, for selecting a predetermined distance to reposition said movable read heads.

4. The apparatus of claim 2 wherein said means for repositioning further comprises:

means, responsive to said determined location, for computing a distance to reposition said movable read heads.

5. The apparatus of claim 1 wherein said means for combining includes:

means for storing said at least one track in a memory; and means for combining in said memory said section with said at least one track.

6. A method in a tape drive to read data, written in helical track form, from a magnetic tape media that is loaded in said tape drive, comprising the steps of:

reading, in response to a magnetic tape being loaded in said tape drive, selected helical tracks written on said magnetic tape using a set of movable read heads;

detecting the presence of a section of at least one track of said data read from said magnetic tape that cannot be read;

rewinding said magnetic tape to a position to reread said at least one track;

repositioning said movable read heads;

rereading said at least one track written on said magnetic tape using a set of movable read heads;

combining data read from said at least one track written on said magnetic tape by said step of reading and said step of rereading.

7. The method of claim 6 wherein said step of repositioning comprises:

determining a location of said section in said at least one track; and selecting, in response to said determined location, a direction to reposition said movable read heads.

8. The method of claim 7 wherein said step of repositioning further comprises:

selecting, in response to said determined location, a predetermined distance to reposition said movable read heads.

9. The method of claim 7 wherein said step of repositioning further comprises:

computing, in response to said determined location, a distance to reposition said movable read heads.

10. The method of claim 6 wherein said step of combining includes:

storing said at least one track in a memory; and combining in said memory said section with said at least one track.

11. The method of claim 6 further comprising the step of:

determining whether said step of reading and said step of rereading have successfully read the entirety of said at least one track; and reactivating said steps of rewinding, repositioning, rereading and combining in response to the entirety of said at least one track failing to be successfully read in its entirety.

* * * * *